(12) United States Patent  
Fujiwara (10) Patent No.: US 10,132,362 B2  
(45) Date of Patent: Nov. 20, 2018

(54) POWER GENERATION DEVICE AND SHAFT COUPLING DEVICE WITH ELASTIC MEMBER USED THEREIN

(71) Applicant: JTEKT CORPORATION, Osaka-shi, Osaka (JP)

(72) Inventor: Hideki Fujiwara, Kitakatsuragi-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 125 days.

(21) Appl. No.: 15/123,606

(22) PCT Filed: Feb. 27, 2015

(86) PCT No.: PCT/JP2015/055758  
§ 371 (c)(1),  
(2) Date: Sep. 2, 2016

(87) PCT Pub. No.: WO2015/133383  
PCT Pub. Date: Sep. 11, 2015

(65) Prior Publication Data  
US 2017/0082155 A1    Mar. 23, 2017

(30) Foreign Application Priority Data  
Mar. 7, 2014   (JP) .................................. 2014-045292

(51) Int. Cl.  
*F16D 3/00* (2006.01)  
*F16D 3/72* (2006.01)  
(Continued)

(52) U.S. Cl.  
CPC .............. *F16D 3/725* (2013.01); *F03D 1/06* (2013.01); *F03D 1/0675* (2013.01); *F03D 9/25* (2016.05);  
(Continued)

(58) Field of Classification Search  
CPC .......... F03D 15/00; F03D 1/06; F03D 1/0675; F05B 2240/60; F05B 2260/50;  
(Continued)

(56) References Cited

U.S. PATENT DOCUMENTS 5,183,139 A  *  2/1993  Malecha ............... F16D 41/067  
                                                       192/113.1  
5,290,508 A      3/1994  Kobayashi et al.  
(Continued)

FOREIGN PATENT DOCUMENTS

EP      2 657 521 A2    10/2013  
JP      H04-099129 A     3/1992  
(Continued)

OTHER PUBLICATIONS

Dec. 5, 2017 Office Action issued in Japanese Patent Application No. 2014-045292.

(Continued)

*Primary Examiner* — Tulsidas C Patel  
*Assistant Examiner* — S. Mikailoff  
(74) *Attorney, Agent, or Firm* — Oliff PLC (57) ABSTRACT

A power generation device includes: a one-way clutch which is provided between an output shaft of a speed increaser and a drive shaft of a power generator, and which restricts relative rotation of the output shaft and the drive shaft in one direction and permits relative rotation thereof in another direction; and a plurality of elastic coupling members which are provided between the output shaft and the drive shaft, which are spaced in an axial direction, and which absorb misalignment between the output shaft and the drive shaft. The one-way clutch is disposed in a position axially outside an area between the plurality of elastic coupling members.

2 Claims, 10 Drawing Sheets

(51) Int. Cl.
| | | |
|---|---|---|
| *F03D 15/10* | (2016.01) | |
| *F03D 9/25* | (2016.01) | |
| *F03D 1/06* | (2006.01) | |
| *F16D 3/78* | (2006.01) | |
| *F16D 41/067* | (2006.01) | |
| *F03D 15/00* | (2016.01) | |
| *F16D 41/066* | (2006.01) | |

(52) U.S. Cl.
CPC .............. *F03D 15/00* (2016.05); *F03D 15/10* (2016.05); *F16D 3/78* (2013.01); *F16D 41/066* (2013.01); *F16D 41/067* (2013.01); *F05B 2240/60* (2013.01); *F05B 2260/50* (2013.01); *Y02E 10/721* (2013.01)

(58) Field of Classification Search
CPC .......... F16D 3/725; F16D 3/78; F16D 41/066; F16D 41/067; Y02E 10/721
See application file for complete search history.

(56) References Cited

U.S. PATENT DOCUMENTS

| | | | |
|---|---|---|---|
| 5,853,073 | A | 12/1998 | Costin |
| 5,947,245 | A | 9/1999 | Costin et al. |
| 5,954,174 | A | 9/1999 | Costin |
| 5,971,122 | A | 10/1999 | Costin et al. |
| 6,062,362 | A | 5/2000 | Costin et al. |
| 6,109,410 | A | 8/2000 | Costin |
| 6,125,979 | A | 10/2000 | Costin et al. |
| 6,500,071 | B1 | 12/2002 | Pollard |
| 8,932,017 | B2 * | 1/2015 | Heidenreich ........... F03D 11/02 290/55 |
| 9,035,476 | B2 * | 5/2015 | Fujiwara .................... F16D 7/10 290/1 C |
| 9,097,239 | B2 * | 8/2015 | Heidenreich ........... F03D 11/02 |
| 9,097,295 | B2 * | 8/2015 | Fujiwara ............... F16D 41/064 |
| 9,995,280 | B2 * | 6/2018 | Fujiwara ............... F16D 41/067 |
| 2012/0025541 | A1 * | 2/2012 | Hirai ....................... F03D 80/60 290/55 |
| 2012/0045335 | A1 * | 2/2012 | Heidenreich ........... F03D 11/02 416/170 R |
| 2012/0201679 | A1 * | 8/2012 | Heidenreich ........... F03D 11/02 416/146 R |
| 2013/0062886 | A1 * | 3/2013 | Fujiwara .................... F16D 7/10 290/1 C |
| 2014/0090945 | A1 * | 4/2014 | Fujiwara ............... F16D 41/067 192/45.001 |
| 2015/0061436 | A1 | 3/2015 | Fujiwara et al. |
| 2016/0025073 | A1 * | 1/2016 | Fujiwara ................ F03D 15/00 416/169 R |
| 2016/0201649 | A1 * | 7/2016 | Fujiwara ............... F16D 41/067 74/405 |
| 2017/0009748 | A1 * | 1/2017 | Fujiwara ............... F16D 41/067 |
| 2017/0082155 | A1 * | 3/2017 | Fujiwara .................... F03D 1/06 |
| 2017/0248175 | A1 * | 8/2017 | Fujiwara ............... F16D 41/067 |

FOREIGN PATENT DOCUMENTS

| | | |
|---|---|---|
| JP | H07-35025 A | 2/1995 |
| JP | H08-226455 A | 9/1996 |
| JP | 2002-526726 A | 8/2002 |
| JP | 2002-276652 A | 9/2002 |
| JP | 2004-339953 A | 12/2004 |
| JP | 2006-250034 A | 9/2006 |
| JP | 2009-250213 A | 10/2009 |
| JP | 2010-223434 A | 10/2010 |
| JP | 2012-013003 A | 1/2012 |
| JP | 2013-060825 A | 4/2013 |
| JP | 2013-238284 A | 11/2013 |

OTHER PUBLICATIONS

Oct. 27, 2017 Extended Search Report issued in European Patent Application No. 15758556.3.
Jun. 2, 2015 International Search Report issued in International Patent Application No. PCT/JP2015/055758.
Jun. 2, 2015 Written Opinion of the International Searching Authority issued in International Patent Application No. PCT/JP2015/055758.
Jul. 17, 2018 Office Action issued in Japanese Patent Application No. 2014-045292.

\* cited by examiner

POWER GENERATION DEVICE AND SHAFT COUPLING DEVICE WITH ELASTIC MEMBER USED THEREIN

TECHNICAL FIELD

An aspect of the present invention relates to a power generation device that generates power by using power such as wind power and a shaft coupling device used therein.

BACKGROUND ART

Conventionally, a wind power generation device has been known in which wind power is received by a blade connected to the main shaft to thereby rotate the main shaft, the rotation of the main shaft is increased in speed by a speed increaser and transmitted to the drive shaft of the power generator and a rotor connected to the drive shaft is rotated to thereby generate power.

In this type of wind power generation device, since power generation efficiency deteriorates if the number of rotations of the drive shaft of the power generator decreases due to reduction in wind power, a one-way clutch is provided between the output shaft of the speed increaser and the drive shaft of the power generator and even if the speed of the rotation on the output shaft side decreases, power generation efficiency is maintained by cutting off the one-way clutch so that the drive shaft side is rotated by the inertia of the rotor (for example, see Patent Document 1).

Moreover, since misalignment such as decentering or angle deviation sometimes occurs between the output shaft of the speed increaser and the drive shaft of the power generator, to absorb this, the output shaft and the drive shaft are sometimes connected through a shaft coupling having an elastically deformable link member (elastic coupling member) made of a synthetic resin (for example, see Patent Document 2).

RELATED ART DOCUMENTS

Patent Documents

Patent Document 1: JP-A-2006-250034
Patent Document 2: JP-A-2004-339953

SUMMARY OF THE INVENTION

Problem to be Solved by the Invention

The one-way clutch described in Patent Document 1 sometimes largely whirls because of the vibration caused on the output shaft side. For this reason, for example, if a structure is adopted in which the link member of Patent Document 2 is provided at each end portion, in the axial direction, of the one-way clutch of Patent Document 1, the load due to the whirl of the one-way clutch acts on the link members made of a synthetic resin, so that the burden on the link members increases and the lives thereof can decrease.

Moreover, there is a case where the speed increaser of the wind power generation device is not fixed to the floor surface in the nacelle and is supported by the power generator fixed to the floor surface, the bearing unit for the main shaft or the like. In this case, since the vibration caused on the speed increaser is large, the whirl of the one-way clutch is larger, so that the burden on the elastic coupling member can further increase.

An object of an aspect of the present invention is to provide a power generation device and a shaft coupling device used therein where when an elastic coupling member and a one-way clutch unit are provided between the output shaft of the speed increaser and the input shaft of the power generator, the burden on the elastic coupling member can be reduced.

Means for Solving the Problem

A power generation device according to a first aspect of the present invention includes: a speed increaser which increases rotational power of a drive source in speed and which outputs it from an output shaft; a power generator which generates power by receiving an output of the output shaft by a drive shaft; a one-way clutch which is provided between the output shaft and the drive shaft, and which restricts relative rotation of the output shaft and the drive shaft in one direction and permits relative rotation thereof in another direction; and a plurality of elastic coupling members which are provided between the output shaft and the drive shaft, which are spaced in an axial direction, and which absorb misalignment between the output shaft and the drive shaft, and the one-way clutch is disposed in a position axially outside an area between the plurality of elastic coupling members.

According to the first aspect of the present invention, since the one-way clutch is disposed in the position outside the area between the plurality of elastic coupling members, the load on the plurality of elastic coupling members due to the whirl of the one-way clutch is suppressed as much as possible, so that the burden on the elastic coupling members can be reduced.

When the one-way clutch includes a ring body which rotates integrally with the output shaft or the drive shaft, it is preferable that a spacer member which is lower in specific gravity than the ring body be provided between the plurality of elastic coupling members.

By providing the spacer that is lower in specific gravity than the ring body as a constituent element of the one-way clutch between the plurality of elastic coupling members, the load due to the whirl of the spacer is reduced, so that the burden on the elastic coupling members can be reduced as much as possible.

In a state in which the power generator is fixed to a surrounding environment and the speed increaser is not fixed to a surrounding environment and is supported by the power generator, it is preferable that the one-way clutch be disposed closer to the drive shaft than the plurality of elastic coupling members.

With this structure, the one-way clutch can be made away as much as possible from the speed increaser that vibrates largely and be disposed close to the power generator fixed to the surrounding environment. Consequently, the whirl of the one-way clutch due to the vibration of the speed increaser is suppressed, so that the burden on the elastic coupling members can be reduced. The above-mentioned "surrounding environment" indicates the ground (floor surface), a wall surface or the like existing around the power generator and the speed increaser.

A power generation device according to a second aspect of the present invention includes: a speed increaser which increases rotational power of a drive source in speed and which outputs it from an output shaft; a power generator which generates power by receiving an output of the output shaft by a drive shaft; a one-way clutch which is provided between the output shaft and the drive shaft, and which restricts relative rotation of the output shaft and the drive shaft in one direction and permits relative rotation thereof in another direction; and an elastic coupling member which is provided between the output shaft and the drive shaft and which absorbs misalignment between the output shaft and the drive shaft, the power generator is fixed to a surrounding environment, the speed increaser is not fixed to a surrounding environment and is supported by the power generator, and the one-way clutch is disposed closer to the drive shaft than the elastic coupling member.

With this structure, the one-way clutch can be made away as much as possible from the speed increaser that vibrates largely and be disposed close to the power generator fixed to the surrounding environment. Consequently, the whirl of the one-way clutch due to the vibration of the speed increaser is suppressed, so that the burden on the elastic coupling member can be reduced.

It is preferable that the one-way clutch be directly coupled to the drive shaft.

With this structure, the one-way clutch can be suitably supported by the drive shaft of the power generator fixed to the surrounding environment, so that the whirl of the one-way clutch is made smaller and the burden on the elastic coupling member due to the load thereof can be reduced.

A shaft coupling device according to a third aspect of the present invention is a shaft coupling device which connects an output shaft of a speed increaser that increases rotational power of a drive source in speed and a drive shaft of a power generator that generates power by receiving an output of the output shaft, and the shaft coupling device includes: a one-way clutch which restricts relative rotation of the output shaft and the drive shaft in one direction and permits relative rotation thereof in another direction; a spacer member arranged with the one-way clutch in an axial direction; and an elastic coupling member which is provided at an end portion of the spacer member in the axial direction and which absorbs misalignment between the output shaft and the drive shaft, the one-way clutch includes a ring body that rotates integrally with the output shaft or the drive shaft, and the spacer member is formed of a member that is lower in specific gravity than the ring body.

Advantages of the Invention

According to an aspect of the present invention, when the elastic coupling member and the one-way clutch unit are provided between the output shaft of the speed increaser and the input shaft of the power generator in the power generation device, the burden on the elastic coupling member can be suppressed.

MODE FOR CARRYING OUT THE INVENTION

Hereinafter, embodiments of the present invention will be described with reference to the attached drawings.

Figure 1:
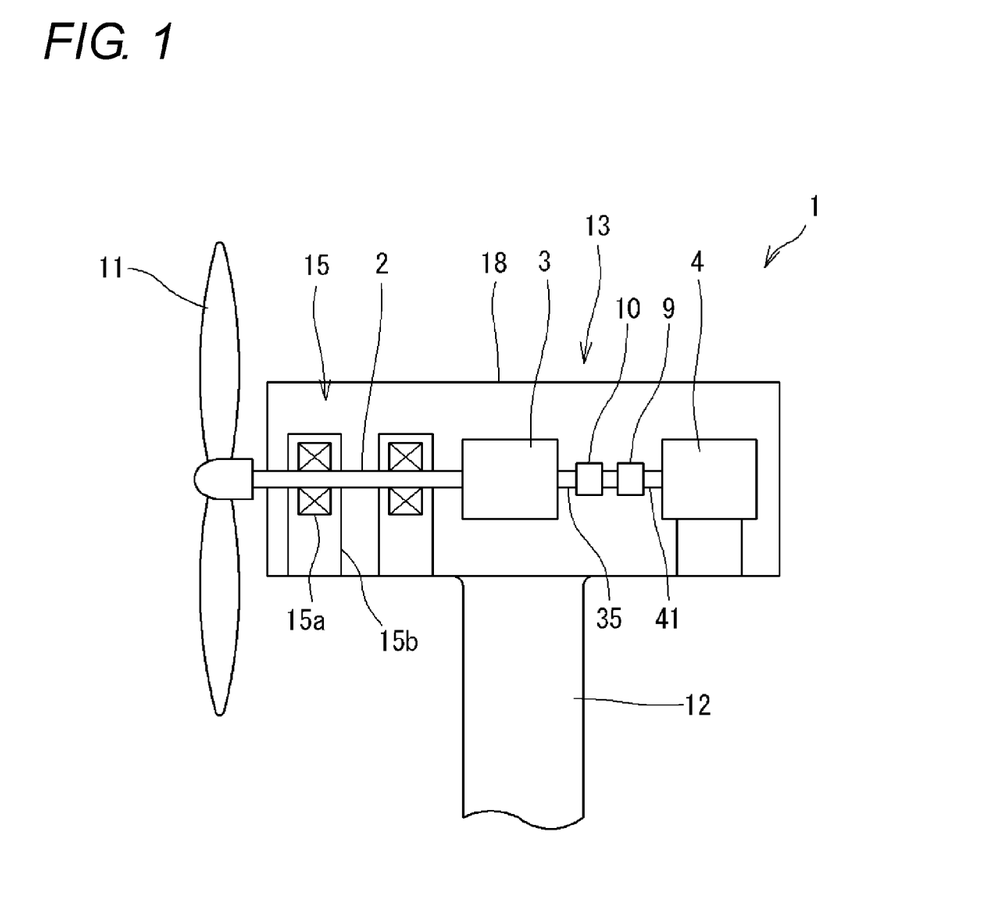
FIG. 1 is a schematic side view of a wind power generation device according to a first embodiment of the present invention.

FIG. 1 is a schematic side view of a wind power generation device according to a first embodiment of the present invention.

The wind power generation device 1 is provided with a blade (wind receiving member) 11, a strut 12 and a nacelle 13. The blade 11 is formed of a plurality of blades provided at an end of a main shaft 2, and rotates the main shaft 2 by receiving wind. The nacelle 13 is provided with the main shaft 2, a support mechanism 15 for supporting the main shaft 2, a speed increaser 3 that increases the rotation speed of the main shaft 2, a power generator 4 that generates power by the rotation power increased in speed by the speed increaser 3, a casing 18 accommodating these, and the like. The strut 12 supports the nacelle 13 in such a manner as to be horizontally rotatable about the shaft center in the vertical direction.

The support mechanism 15 is formed of a bearing unit having a rolling bearing 15a that supports the main shaft 2 in such a manner as to be rotatable and a bearing housing 15b accommodating the rolling bearing 15a. The bearing housing 15b is fixed to the floor surface in the casing 18. Moreover, the power generator 4 is also fixed to the floor surface in the casing 18. On the contrary, the speed increaser 3 is not fixed to the floor surface or the like, and has its one end side in the axial direction supported by the support mechanism 15 through the main shaft 2 and has its other end side supported by the power generator 4.

Figure 2:
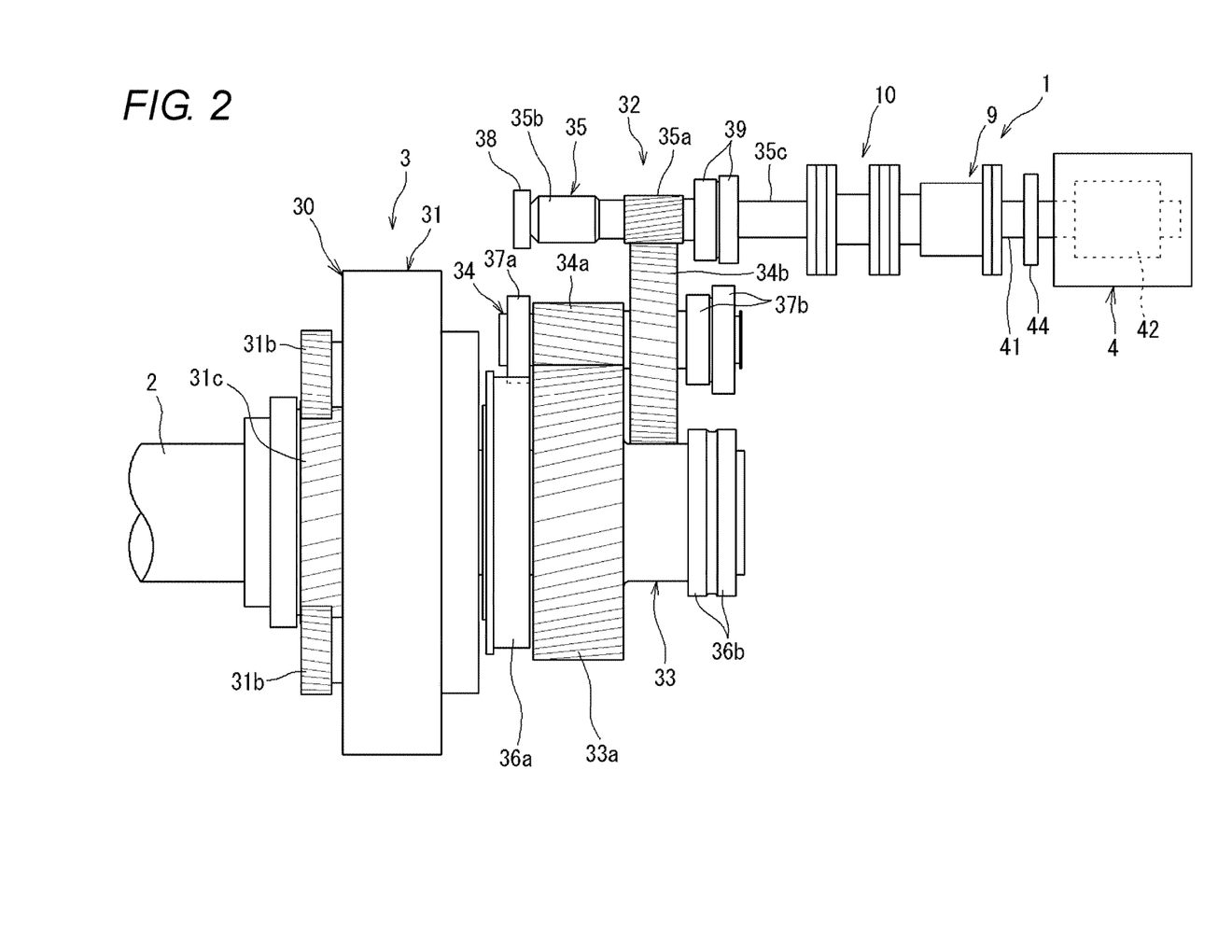
FIG. 2 is a schematic side view of a speed increaser and a power generator shown in FIG. 1.

FIG. 2 is a schematic side view showing the speed increaser 3 and the power generator 4.

The power generator 4 is formed of, for example, an induction power generator, and has a drive shaft (input shaft) 41 that rotates by receiving the rotation increased in speed by the speed increaser 3, a rotor 42 incorporated in the power generator 4, a non-illustrated stator, and the like. The rotor 42 is coupled to the drive shaft 41 in such a manner as to be integrally rotatable, and the power generator 4 generates power by driving the rotor 42 with the rotation of the drive shaft 41. Moreover, the drive shaft 41 is provided with a brake 44 for braking the drive shaft 41.

The speed increaser 3 is provided with a gear mechanism (rotation transmission mechanism) 30 that receives the rotation of the main shaft 2 and increases the speed of the rotation. The gear mechanism 30 is provided with a planet gear mechanism 31 and a high-speed stepped gear mechanism 32 that receives the rotation increased in speed by the planet gear mechanism 31 and further increases the speed of the rotation.

The planet gear mechanism 31 rotates a sun gear 31c through planet gears 31b by the rotation of the main shaft 2, and transmits the rotation to a low-speed shaft 33 of the high-speed stepped gear mechanism 32.

Moreover, the high-speed stepped gear mechanism 32 transmits the rotational power from a low-speed gear 33a of the low-speed shaft 33 to an output shaft 35 through intermediate gears 34a and 34b of an intermediate shaft 34 and a high-speed gear 35a of the output shaft 35. The rotation of the main shaft 2 is increased in speed by the gear ratio among the gears 33a, 34a, 34b and 35a, and is outputted from an output end portion 35c of the output shaft 35.

The low-speed shaft 33 is formed of a large-size rotation shaft with a diameter of, for example, approximately 1 m, and has its both end portions in the axial direction rotatably supported by roller bearings 36a and 36b. The intermediate shaft 34 is disposed above the low-speed shaft 33, and has its both end portions in the axial direction rotatably supported by roller bearings 37a and 37b. The output shaft 35 is disposed above the intermediate shaft 34, and has its one end portion 35b and other end portion (output end portion) 35c sides in the axial direction rotatably supported by roller bearings 38 and 39.

The wind power generation device 1 is provided with a shaft coupling unit 10 that connects the output shaft 35 of the speed increaser 3 and the drive shaft 41 of the power generator 4 in such a manner as to be integrally rotatable and a one-way clutch unit 9 that permits relative rotation, in one direction, of the output shaft 35 and the drive shaft 41 and restricts relative rotation thereof in the other direction. The shaft coupling unit 10 and the one-way clutch unit 9 are disposed so as to be aligned in the axial direction, the shaft coupling unit 10 is disposed on the side of the speed increaser 3, and the one-way clutch unit 9, on the side of the power generator 4. The one-way clutch unit 9 is provided on the speed increaser 3 side of the brake 44 for the drive shaft 41. The shaft coupling unit 10 and the one-way clutch unit 9 constitute the shaft coupling device of the present embodiment.

Figure 3:
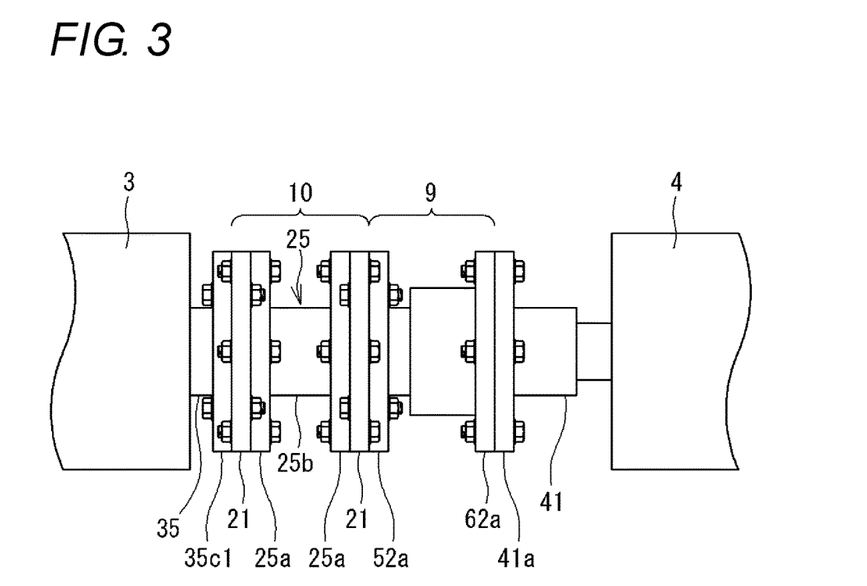
FIG. 3 is a schematic side view showing the part of connection between the speed increaser and the power generator.

FIG. 3 is a schematic side view showing the part of connection between the speed increaser 3 and the power generator 4.

A flange portion 35c1 is provided on the output shaft 35 of the speed increaser 3, and the shaft coupling unit 10 is coupled to the flange portion 35c1. Moreover, a flange portion 41a is provided on the drive shaft 41 of the power generator 4, and the one-way clutch unit 9 is coupled to the flange portion 41a.

Flange portions 25a are provided on both end portions of the shaft coupling unit 10 in the axial direction, and flange portions 52a and 62a are also provided on both end portions of the one-way clutch unit 9. One flange portion 25a of the shaft coupling unit 10 and the flange portion 35c1 of the speed increaser 3 are coupled, and the other flange portion 25a of the shaft coupling unit 10 and one flange portion 52a of the one-way clutch unit 9 are coupled. The other flange portion 62a of the one-way clutch unit 9 is coupled to the flange portion 41a of the power generator 4. The shaft coupling unit 10 also includes elastic coupling members (flexible members) 21 interposed between the flange portions 25a and the flange portions 35c1 and 52a.

Figure 4:
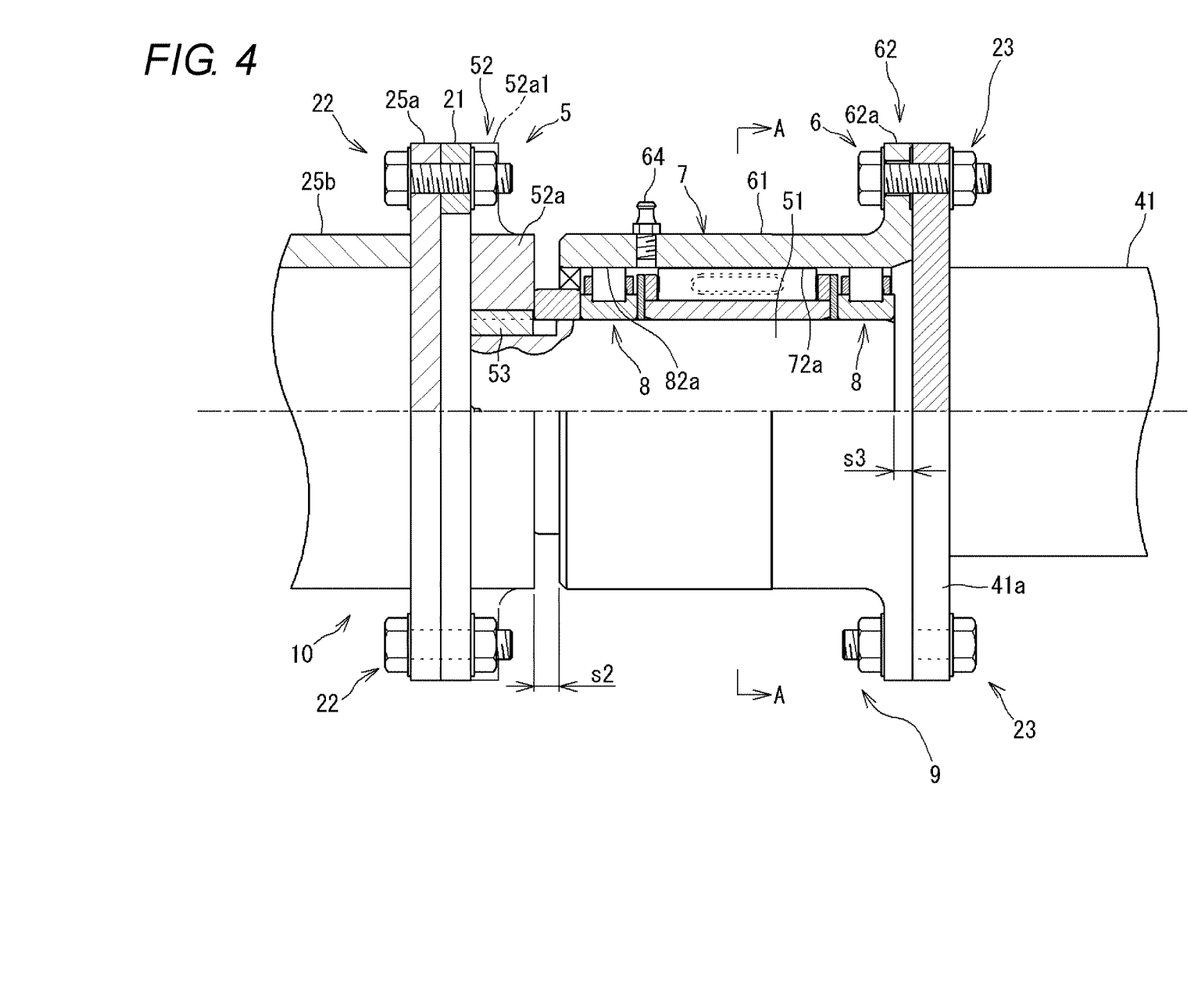
FIG. 4 is a side view (partial cross-sectional view) of a one-way clutch unit shown in FIG. 1.
Figure 5:
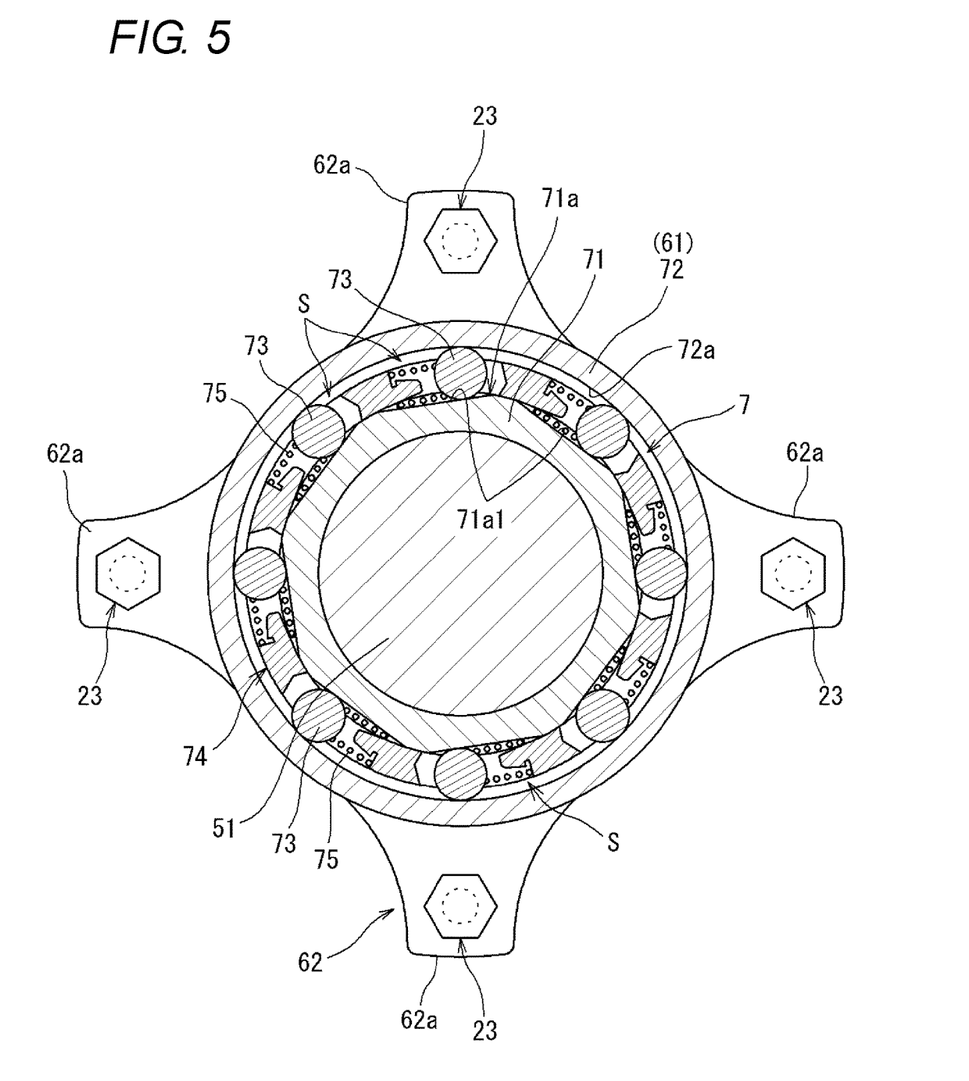
FIG. 5 is a cross-sectional view on arrow A-A in FIG. 4.

FIG. 4 is a side view (partial cross-sectional view) showing the one-way clutch unit. FIG. 5 is a cross-sectional view on arrow A-A in FIG. 4.

The one-way clutch unit 9 is provided with an input rotator 5, an output rotator 6, a one-way clutch 7 and rolling bearings 8. The input rotator 5 is provided with a shaft portion 51 and an input side coupling portion 52 provided on one end portion (the left end portion in FIG. 4) of the shaft portion 51 in the axial direction. On the input side coupling portion 52, the flange portion (flange plate) 52a is provided that is coupled to the flange portion 25a and the elastic coupling member 21 of the shaft coupling unit 10 in such a manner as to be integrally rotatable and detachably attachable. The shaft portion 51 and the flange portion 52a are united by a key 53 in such a manner as to be integrally rotatable. Moreover, the flange portion 52a has protruding portions 52a1 (see FIG. 8) protruding outward in the radial direction at intervals of 90° in the circumferential direction in four positions of the outer peripheral part. The protruding portions 52a1 are substantially coupled to the flange portion 25a of the shaft coupling unit 10 through fasteners 22.

The output rotator 6 is disposed concentrically with the input rotator 5, and is provided with a cylindrical portion 61 formed in the shape of a hollow cylinder and an output side coupling portion 62 provided on the other end portion (the right end portion in FIG. 4) of the cylindrical portion 61 in the axial direction. The output side coupling portion 62 is provided with four flange portions 62a connected to the flange portion 41a of the drive shaft 41 in such a manner as to be integrally rotatable and detachably attachable. The flange portions 62a protrude outward in the radial direction from the outer peripheral surface of the cylindrical portion 61 at intervals of 90° in the circumferential direction (see FIG. 5). The flange portions 62a are coupled to the flange portion 41a of the drive shaft 41 by fasteners 23 formed of bolts and nuts.

The one-way clutch 7 is disposed in an area between the input rotator 5 and the output rotator 6 where these overlap while facing each other in the radial direction. Moreover, the rolling bearings 8 are disposed on both sides of the one-way clutch 7 in the axial direction between the input rotator 5 and the output rotator 6. The one-way clutch 7 is provided in order to transmit the rotation of the shaft coupling unit 10 on the side of the output shaft 35 to the drive shaft 41 through the input rotator 5 and the output rotator 6 in such a manner as to be connectable and disconnectable, and the rolling bearings 8 are provided in order to support the input rotator 5 and the output rotator 6 each other. While the rolling bearing 8 is disposed on each side of the one-way clutch 7 in the axial direction in the wind power generation device 1 of the present embodiment, a structure may be adopted in which it is disposed only on one side of the one-way clutch 7 in the axial direction.

Between the shaft portion 51 of the input rotator 5 and the cylindrical portion 61 of the output rotator 6, a grease (lubricant) for lubricating the one-way clutch 7 and the rolling bearings 8 disposed thereinside is filled. Moreover, to the outer peripheral part of the cylindrical portion 61, a grease nipple (fill opening with a check valve) 64 for supplying grease to the lubrication space between the cylindrical portion 61 and the shaft portion 51 is attached.

Figure 6:
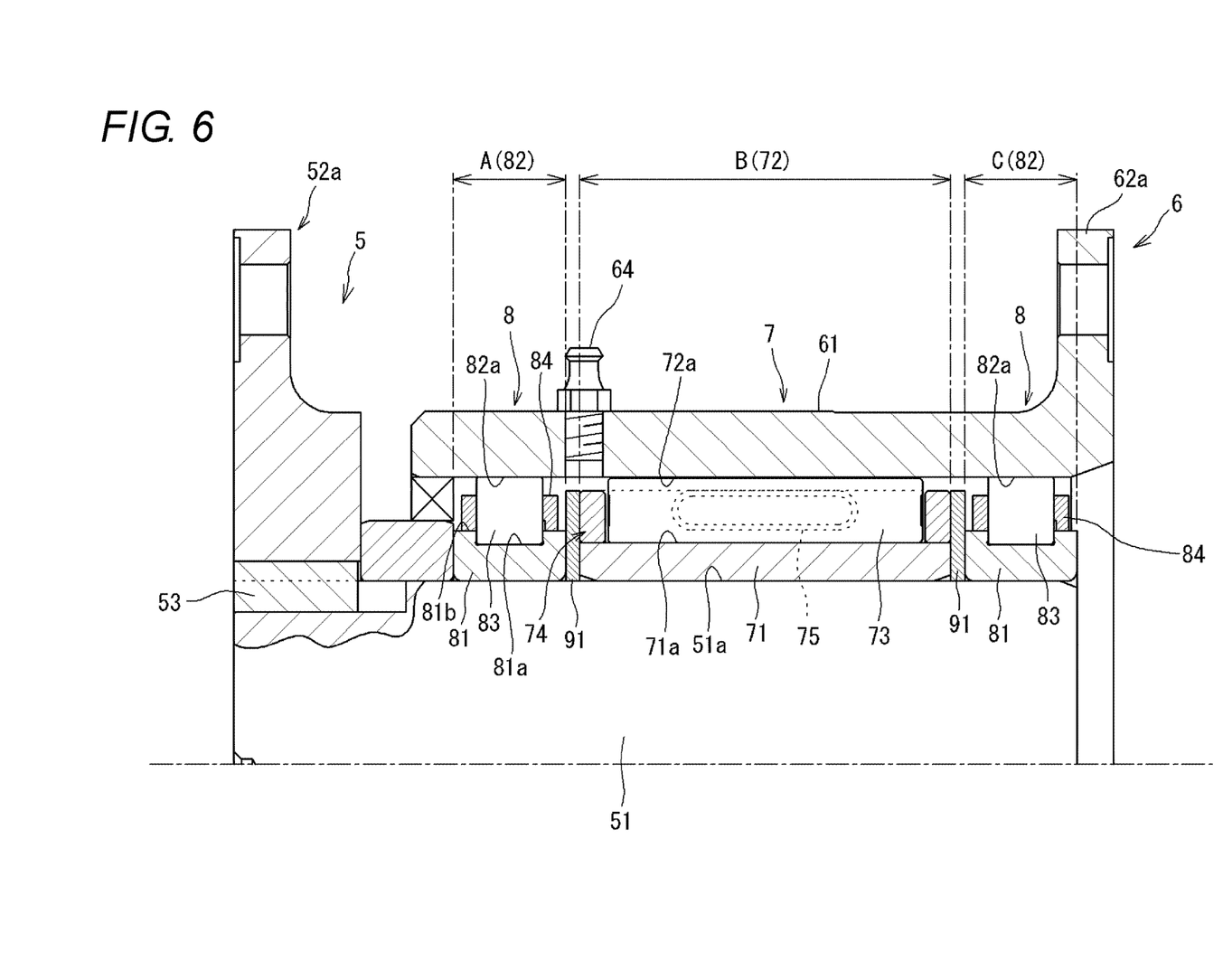
FIG. 6 is a cross-sectional view showing an enlargement of the one-way clutch and rolling bearings.

FIG. 6 is a cross-sectional view showing an enlargement of the one-way clutch and the rolling bearings.

As shown in FIG. 5 and FIG. 6, the one-way clutch 7 is provided with an inner ring 71 and an outer ring 72 (ring bodies) and a plurality of rollers (engagement elements) 73 disposed between an outer peripheral surface 71a of the inner ring 71 and an inner peripheral surface 72a of the outer ring 72. The inner and outer rings 71 and 72 and the rollers 73 are formed of, for example, a metal such as bearing steel.

The inner ring 71 is fixed by being fitted on a middle part of the shaft portion 51 of the input rotator 5 in the axial direction, and rotates integrally with the shaft portion 51. An area B of the middle part of the cylindrical portion 61 of the output rotator 6 in the axial direction is made the outer ring 72 of the one-way clutch 7. Therefore, the inner peripheral surface of the area B of the cylindrical portion 61 forms the outer ring inner peripheral surface 72a where the rollers 73 roll. In the present embodiment, the rollers 73 are formed in the shape of a solid cylinder and are provided eight in number in the circumferential direction.

The one-way clutch 7 is further provided with a ring-shaped cage 74 holding the rollers 73 at predetermined intervals in the circumferential direction and a plurality of elastic members (pushing members) 75 elastically pushing the rollers 73 in one direction.

As shown in FIG. 5, flat cam surfaces 71a1 of the same number (eight) as that of the rollers 73 are formed on the outer peripheral surface 71a of the inner ring 71, and the inner peripheral surface 72a of the outer ring 72 is a cylindrical surface. Between the cam surfaces 71a1 of the inner ring 71 and the cylindrical surface 72a of the outer ring 72, a plurality of (eight) wedge-shaped spaces S where the rollers 73 are disposed are formed in the circumferential direction. The rollers 73 are pushed by the elastic members 75 in a direction in which the wedge-shaped spaces S become narrower.

In the one-way clutch 7 structured as described above, when the rotation speed of the input rotator 5 is higher than the rotation speed of the output rotator 6 by the input rotator 5 rotating with increasing speed, the inner ring 71 behaves so as to rotate in one direction (the counterclockwise direction in FIG. 5) relatively to the outer ring 72. In this case, by the pressing force of the elastic members 75, the rollers 73 slightly move in the direction in which the wedge-shaped spaces S become narrower so that the outer peripheral surfaces of the rollers 73 are in pressure contact with the cam surfaces 71a1 of the inner ring 71 and the inner peripheral surface 72a of the outer ring 72, which results in a condition where the rollers 73 are meshed between the inner and outer rings 71 and 72. This enables the inner and outer rings 71 and 72 to integrally rotate in one direction, so that the input rotator 5 and the output rotator 6 can be connected in such a manner as to be integrally rotatable.

Moreover, when the rotation of the input rotator 5 becomes a constant speed rotation after the rotation with increasing speed and the rotation speed of the input rotator 5 becomes the same as the rotation speed of the output rotator 6, the rollers 73 are held in a state of being meshed between the inner and outer rings 71 and 72. For this reason, the one-way clutch 7 maintains the integral rotation of the inner and outer rings 71 and 72 in the one direction, so that the input rotator 5 and the output rotator 6 continue to rotate integrally.

On the other hand, when the rotation speed of the input rotator 5 is lower than the rotation speed of the output rotator 6 because of the deceleration of rotation of the input rotator 5, the inner ring 71 behaves so as to rotate in the other direction (the clockwise direction in FIG. 5) relatively to the outer ring 72. In this case, the meshing between the rollers 73 and the inner and outer rings 71 and 72 is released by the rollers 73 slightly moving in a direction in which the wedge-shaped spaces S become wider against the pressing force of the elastic members 75. As described above, the input rotator 5 and the output rotator 6 are disconnected by the meshing of the rollers 73 being released.

Therefore, even if the rotation speed of the output shaft 35 drastically decreases through the main shaft 2 because of reduction in wind power, the rotor 42 of the power generator 4 does not drastically decelerate but continues rotating by inertia by the input rotator 5 and the output rotator 6 being disconnected. Consequently, the average rotation speed of the rotor 42 can be increased, so that the power generation efficiency of the power generator 4 can be improved.

In FIG. 6, a pair of rolling bearings 8 are disposed between the shaft portion 51 of the input rotator 5 and the cylindrical portion 61 of the output rotator 6, and support the input rotator 5 and the output rotator 6 in such a manner as to be rotatable relatively to each other. Moreover, the rolling bearings 8 are disposed on both sides of the one-way clutch 7 in the axial direction so as to adjoin through washers (positioners) 91. The washers 91 are formed by shaping a thin plate material of a metal such as SPCC into a ring.

The rolling bearings 8 are each formed of a cylindrical roller bearing provided with an inner ring 81 and an outer ring 82 as raceway rings, a plurality of cylindrical rollers (rolling elements) 83 rollably disposed between the inner ring 81 and the outer ring 82 and a cage 84 holding the circumferential distance between the plurality of cylindrical rollers 83.

The inner rings 81 each have an inner ring raceway surface 81a formed on the outer periphery and inner ring brim portions 81b formed so as to protrude outward in the radial direction on both sides of the inner ring raceway surface 81a in the axial direction. Both end surfaces of the cylindrical rollers 83 are in slide contact with the inner side surfaces of the inner ring brim portions 81b.

An area A and an area C of both end portions, in the axial direction, of the cylindrical portion 61 in the output rotator 6 are made the outer rings 82 of the rolling bearings 8, and outer ring raceway surfaces 82a of the outer rings 82 are formed on the inner peripheral surfaces of the areas A and C. The cylindrical rollers 83 are rollably disposed between the outer ring raceway surfaces 82a and the inner ring raceway surfaces 81a Therefore, the cylindrical portion 61 of the output rotator 6 acts also as the outer ring 72 of the one-way clutch 7 and the outer rings 82 of the rolling bearings 8, and the outer ring inner peripheral surface 72a of the one-way clutch 7 and the outer ring raceway surfaces 82a of the rolling bearings 8 are formed so as to have the same inside diameter. In other words, the outer ring 72 of the one-way clutch 7 and the outer rings 82 of the rolling bearings 8 are integrally formed.

As described above, since the rolling bearings 8 that support the input rotator 5 and the output rotator 6 in such a manner as to be rotatable relatively to each other are disposed between them, when the meshing between the rollers 73 and the inner and outer rings 71 and 72 is released at the one-way clutch 7 to thereby form a clearance between the rollers 73 and the inner and outer rings 71 and 72 in the wedge-shaped spaces S, the input rotator 5 and the output rotator 6 can be prevented by the rolling bearings 8 from moving in the radial direction relatively to each other. Consequently, the input rotator 5 and the output rotator 6 can be prevented from rattling in the radial direction while the wind power generation device 1 is operating.

Moreover, the outer ring inner peripheral surface 72a of the one-way clutch 7 and the outer ring raceway surfaces 82a of the rolling bearings 8 are formed on the inner peripheral surface of the cylindrical portion 61 of the output rotator 6 which is a common member. For this reason, the output rotator 6 can be used also as the outer ring 72 of the one-way clutch 7 and the outer rings 82 of the rolling bearings 8. Thereby, the overall structure of the wind power generation device 1 can be simplified.

Figure 7:
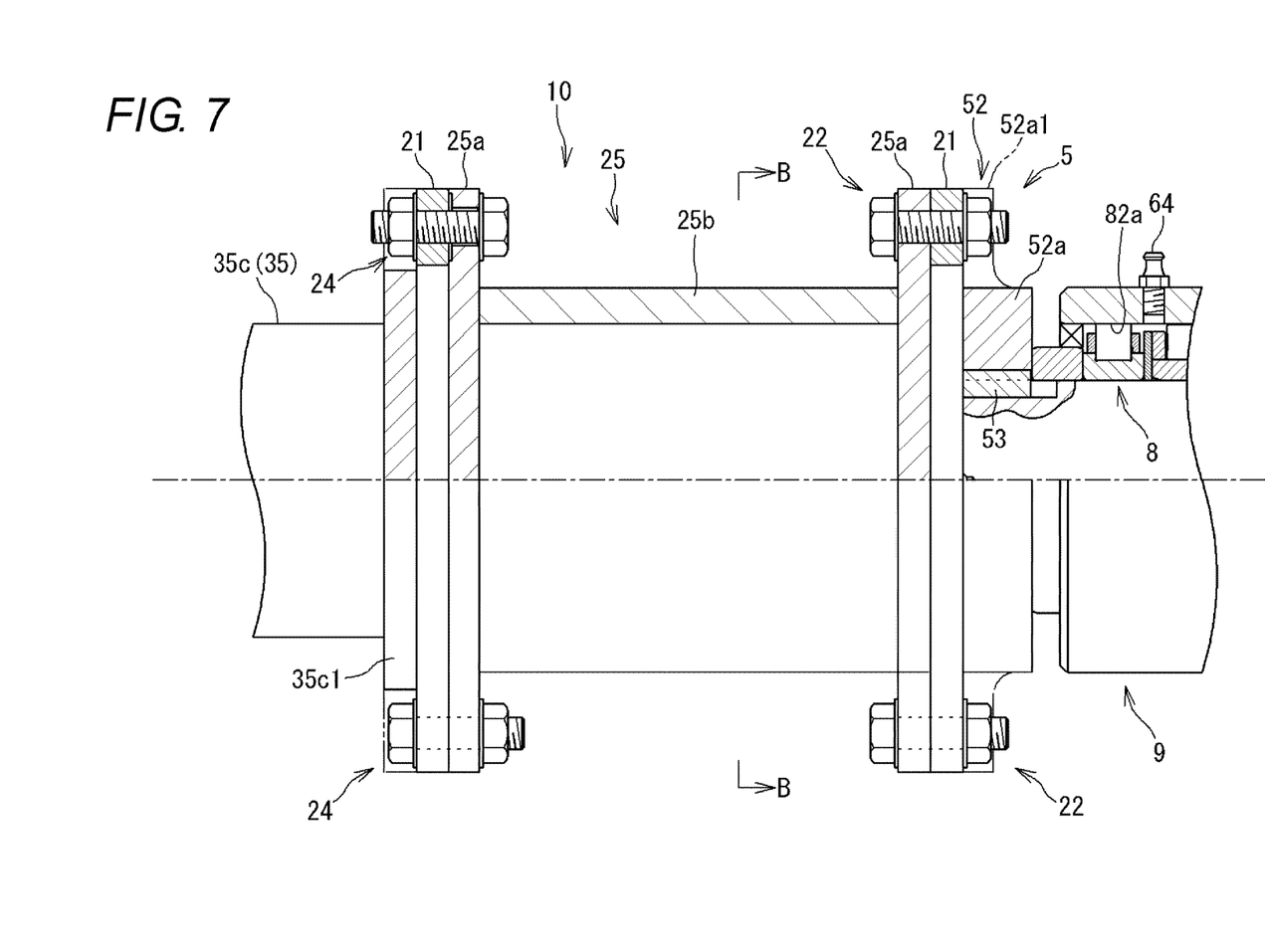
FIG. 7 is a side view (partial cross-sectional view) showing a shaft coupling unit shown in FIG. 1.
Figure 8:
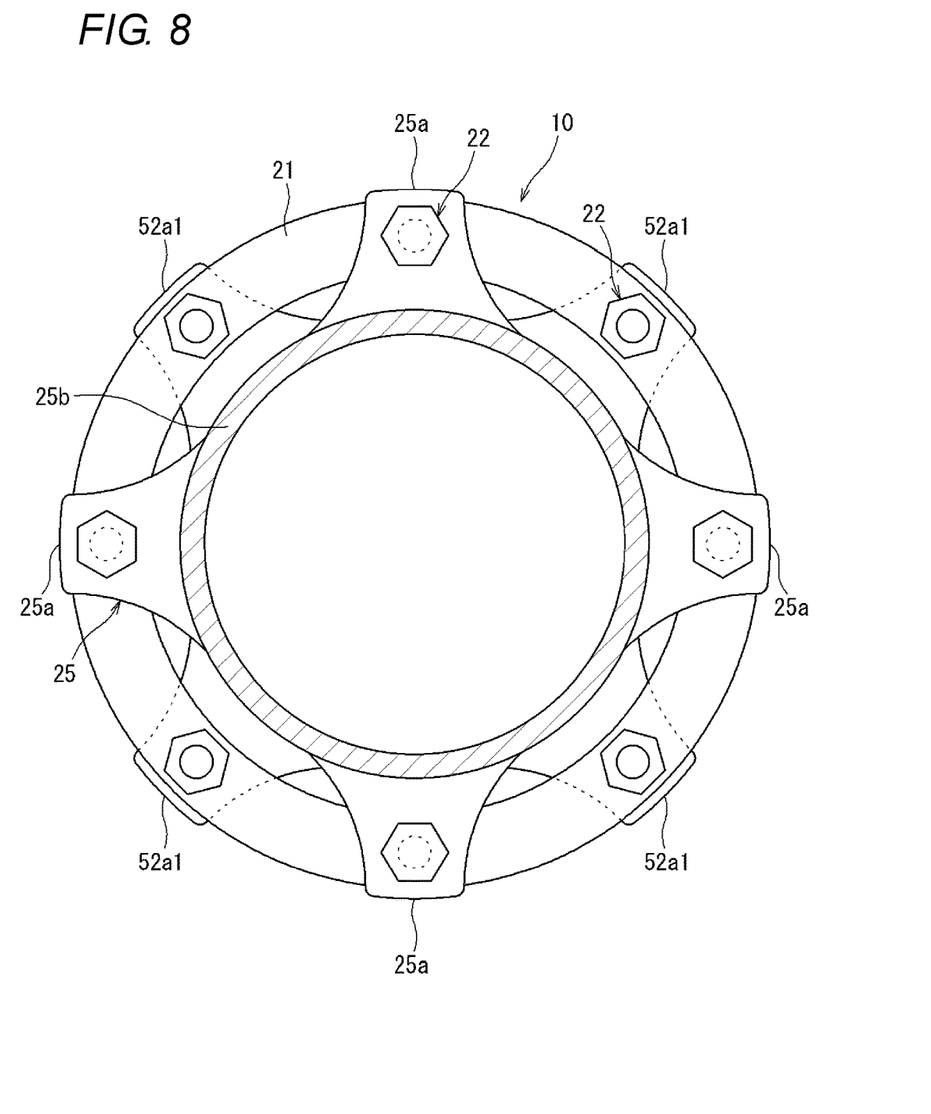
FIG. 8 is a cross-sectional view on arrow B-B in FIG. 7.

FIG. 7 is a side view (partial cross-sectional view) showing the shaft coupling unit. FIG. 8 is a cross-sectional view on arrow B-B in FIG. 7.

The shaft coupling unit 10 is provided with a spacer member 25 and the elastic coupling members 21. The spacer member 25 is provided with a cylindrical portion 25b in the shape of a hollow cylinder and the flange portions 25a provided on both end portions of the cylindrical portion 25b in the axial direction. The flange portions 25a protrude outward in the radial direction in four positions in the circumferential direction, and are coupled to the flange portion 35c1 of the output shaft 35 and the flange portion 52a (the protruding portions 52a1) of the one-way clutch unit 9 through the elastic coupling members 21.

The elastic coupling members 21 have the function of absorbing misalignment such as decentering or angle deviation (shaft misalignment) between the output shaft 35 and the drive shaft 41 (substantially, the one-way clutch unit 9) by its own flection (elastic deformation). The elastic coupling members 21 of the present embodiment are formed of a fiber-reinforced synthetic resin material or the like in a ring shape. On the elastic coupling members 21, a total of eight bolt insertion holes are formed at even intervals in the circumferential direction.

As shown in FIG. 8, the flange portions 25a of the spacer member 25 and the flange portion 52a of the one-way clutch unit 9 coupled together are disposed in a state of being shifted in phase by 45° with respect to the circumferential direction, and are coupled to the ring-shaped elastic coupling members 21 through the fasteners 22.

Moreover, as shown in FIG. 7, the flange portions 25a of the spacer member 25 and the flange portion 35c1 of the output shaft 35 coupled together are also disposed in a state of being shifted in phase by 45° with respect to the circumferential direction although not shown, and are coupled to the elastic coupling members 21 through fasteners 24.

As shown in FIG. 6, the one-way clutch 7 is provided with the shaft portion 51 of the input rotator 5, the cylindrical portion 61 of the output rotator 6, the rollers 73 and the like as constituent elements, and has a certain amount of weight. For this reason, it can whirl because of the vibrations on the side of the speed increaser 3 and on the side of the power generator 4. On the other hand, the elastic coupling members 21 in the shaft coupling unit 10 are made of a synthetic resin, and if the burden increases due to the application of the load by the whirl of the one-way clutch 7, durability can significantly decrease.

Since the one-way clutch 7 of the present embodiment is disposed in a position axially outside the area between the two elastic coupling members 21 in the shaft coupling unit 10, the burden on the elastic coupling members 21 due to the whirl of the one-way clutch 7 can be reduced compared with when it is disposed between the elastic coupling members 21.

Moreover, in the present embodiment, since the speed increaser 3 is not fixed to the floor surface of the casing 18 in the nacelle 13, vibration readily occurs and this vibration makes the one-way clutch 7 more likely to whirl; however, in the present embodiment, since the one-way clutch 7 is disposed on the power generator 4 side of the elastic coupling members 21 so as to be away from the speed increaser 3, the whirl of the one-way clutch 7 accompanying the vibration of the speed increaser 3 can be suppressed. Consequently, the burden on the elastic coupling members 21 due to the whirl can also be reduced.

Further, since the one-way clutch 7 (the one-way clutch unit 9) is substantially coupled directly to the power generator 4, it is firmly supported by the power generator 4. Consequently, the whirl of the one-way clutch 7 is suitably suppressed, so that the burden on the elastic coupling members 21 can be effectively reduced.

The spacer member 25 of the present embodiment is formed of a lightweight member of an aluminum alloy or the like, specifically, a member that is lower in specific gravity than the outer ring 72, the inner ring 71 and the like constituting the one-way clutch 7. For this reason, even when the spacer member 25 is disposed between the two elastic coupling members 21 and further, disposed on the side of the speed increaser 3 where vibration is large, the load acting on the elastic coupling members 21 due to the whirl by the vibration can be reduced, so that the burden on the elastic coupling members 21 can be reduced.

When the brake 44 that brakes the drive shaft 41 is provided as shown in FIG. 2, it is preferable that the one-way clutch 7 and the one-way clutch unit 9 incorporating this be disposed between the speed increaser 3 and the brake 44. This is because if the one-way clutch 7 is disposed between the brake 44 and the power generator 4, it is difficult to swiftly stop the power generator 4 at times such as when an anomaly of the power generator 4 occurs since only the rotation on the side of the speed increaser 3 is decelerated even if the brake 44 is applied during rotation and the rotation on the side of the power generator 4 is continued by the one-way clutch 7 to cause idling.

Figure 9:
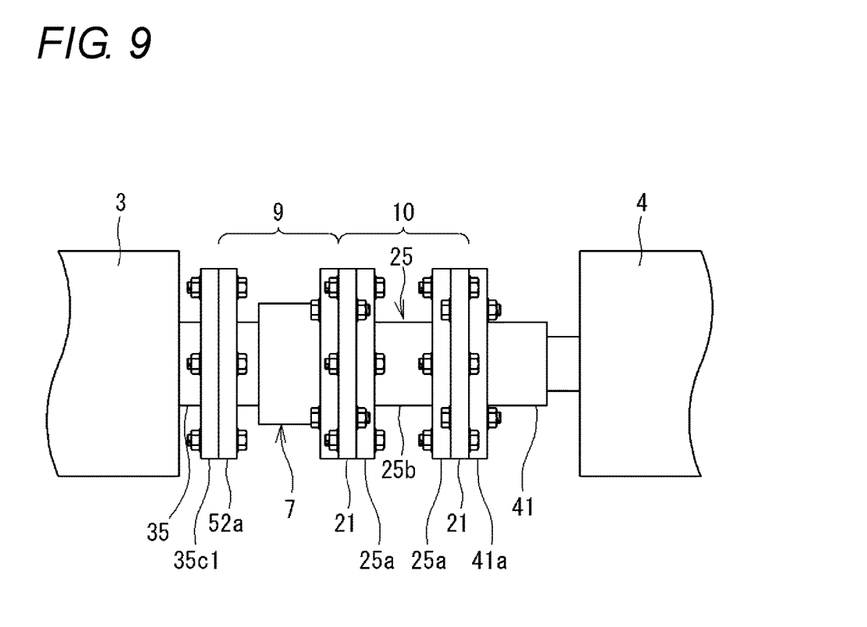
FIG. 9 is a schematic side view showing the part of connection between the speed increaser and the power generator in a second embodiment of the present invention.

FIG. 9 is a schematic side view showing the part of connection between the speed increaser and the power generator in a second embodiment of the present invention.

In the present embodiment, the placement of the shaft coupling unit 10 and the one-way clutch unit 9 in the axial direction is different from that of the above-described first embodiment. That is, in the present embodiment, the shaft coupling unit 10 is disposed on the side of the power generator 4, and the one-way clutch unit 9 is disposed on the side of the speed increaser 3.

Therefore, in the present embodiment, the one-way clutch 7 (the one-way clutch unit 9) is also disposed in a position deviated from between the two elastic coupling members 21, so that the burden on the elastic coupling members 21 due to the whirl of the one-way clutch 7 can be reduced.

However, since the vibration of the speed increaser 3 is readily transmitted to the one-way clutch 7 and the whirl of the one-way clutch 7 can be large in the present embodiment, the above-described first embodiment is more advantageous in this regard.

The present invention is not limited to the above-described embodiments but may be modified within the scope of the invention described in claims.

For example, while the flange portions (or the protruding portions) 35c1, 25a, 52a1 and 62a are provided in four positions at intervals in the circumferential direction in the above-described embodiments, they may be provided in three positions or five or more positions, and the flange portions may be formed in a disc shape.

The specific configuration of the one-way clutch 7 may also be modified as appropriate. For example, sprags may be used instead of the rollers 73.

Moreover, while the output rotator 6 is disposed radially outside the input rotator 5, it may be disposed radially inside the input rotator 5.

Further, while the output rotator 6 is made the outer ring of the one-way clutch 7 and the outer rings of the rolling bearings 8 in the present embodiment, these outer rings may be provided as members separate from the output rotator.

Moreover, while the rolling bearings disposed between the input rotator and the output rotator are cylindrical roller bearings in order to move the output rotator in the axial direction, they may be ball bearings when the output rotator is not moved in the axial direction.

Figure 10:
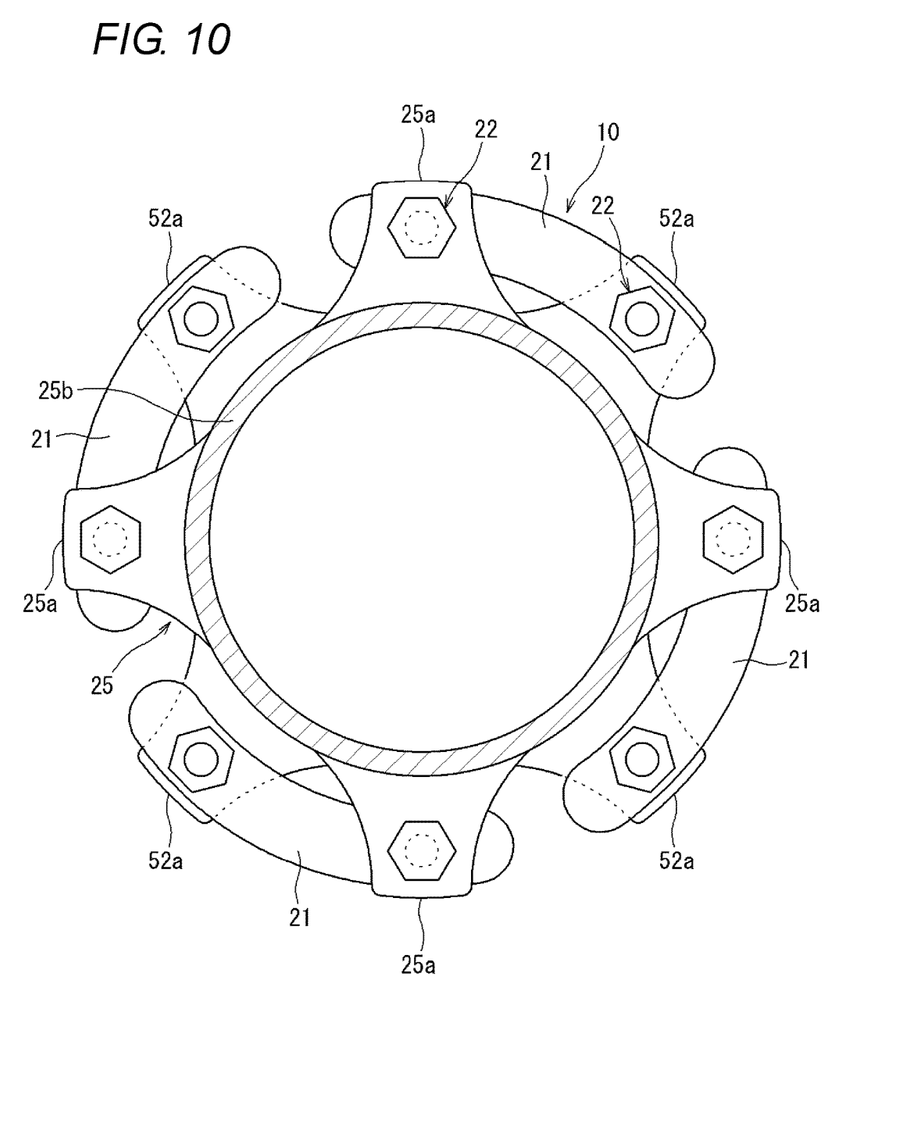
FIG. 10 is a front view showing a modification of elastic coupling members.

While the shaft coupling unit 10 is provided with the ring-shaped elastic coupling members 21 in the above-described embodiment, it may be provided with a plurality of elastic coupling members 21 formed in an arc shape as in the modification shown in FIG. 10.

A structure may be adopted in which the elastic coupling member 21 may be provided only on one side of the spacer member 25 in the axial direction.

While a wind power generation device that operates with wind power as the drive source is described in the above-described embodiments, the present embodiment may be a power generation device that operates with a different drive source such as hydraulic power or steam pressure.

The present application is based upon Japanese Patent Application (Patent Application No. 2014-045292) filed on Mar. 7, 2014, the contents of which are incorporated herein by reference.

DESCRIPTION OF REFERENCE SIGNS

1: Wind power generation device; 3: speed increaser; 4: power generator; 5: input rotator; 6: output rotator; 7: one-way clutch; 21: elastic coupling member; 25: spacer member; 35: output shaft; 41: drive shaft; 71: inner ring (ring body); 72: outer ring (ring body)

The invention claimed is:

1. A power generation device comprising:
a speed increaser which increases rotational speed of a drive source and which outputs an output via an output shaft;
a power generator which generates power by receiving the output of the output shaft by a drive shaft;
a one-way clutch which is provided between the output shaft and the drive shaft, and which restricts relative rotation of the output shaft and the drive shaft in one direction and permits relative rotation thereof in another direction; and
a plurality of elastic coupling members which are provided between the output shaft and the drive shaft, which are spaced in an axial direction, and which absorb misalignment between the output shaft and the drive shaft, wherein
the one-way clutch is disposed axially outside an area defined by the plurality of elastic coupling members,
the one-way clutch comprises a ring body which rotates integrally with the output shaft or the drive shaft,
a spacer member which is made of a material whose specific gravity is lower than that of a material forming the ring body is provided between the plurality of elastic coupling members,
the power generator is fixed to a surface of a casing, and the speed increaser is not fixed to the surface of the casing and is supported by the power generator, and
the one-way clutch is disposed closer than the plurality of elastic coupling members to the drive shaft.

2. The power generation device according to claim 1, wherein
the one-way clutch is directly coupled to the drive shaft.

* * * * *